Oct. 10, 1933.    E. E. DRAPER    1,930,228
APPARATUS FOR VIEWING STEREOSCOPIC PICTURES
Filed May 27, 1931

INVENTOR
Ernest E. Draper
BY
Harvey Rea Dodson
ATTORNEY

Patented Oct. 10, 1933

1,930,228

UNITED STATES PATENT OFFICE 1,930,228

APPARATUS FOR VIEWING STEREOSCOPIC PICTURES

Ernest E. Draper, Scarsdale, N. Y., assignor to The Perser Corporation, New York, N. Y., a corporation of New York Application May 27, 1931. Serial No. 540,321

5 Claims. (Cl. 88—16.6)

Figure 1:
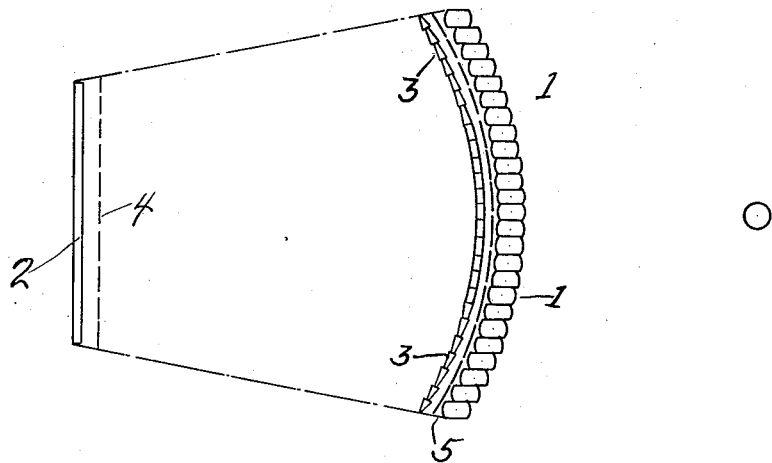
Figure 2:
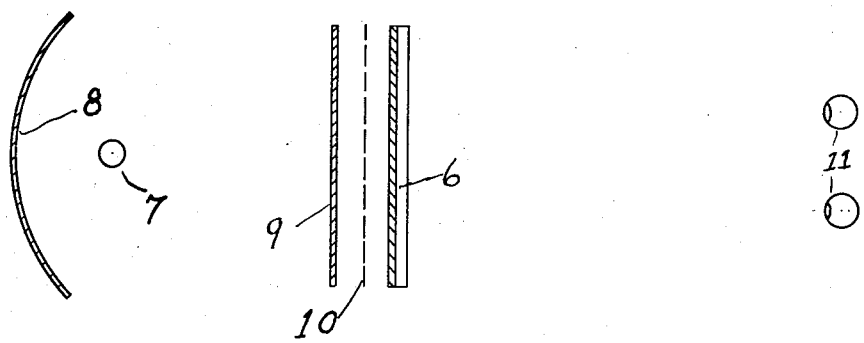

My invention relates to that class of pictures described in my copending application, Serial No. 473,929, filed Aug. 8, 1930 of which this is a division in so far as Fig. 1 of the drawing is concerned, Fig. 2 showing additional subject matter not shown in the said application.

It is well known that numerous attempts have been made to produce stereoscopic pictures taken and viewed through line screens. In some instances, notably those in which the most successful pictures have been made, the camera is swung about the article being photographed and the line screen or plate is moved in synchronization with the movement of the camera. Other attempts have been made by the French Scientist Bessiere, to secure approximate results by the employment of a very large lens but in both instances the exposure is made through a screen of alternate, opaque and transparent vertical lines. This produces a negative consisting of a plurality of panel strip images which, when made into a positive, will form a pseudoscopic positive, when viewed with a vertical line screen in front of it, but which becomes stereoscopic when viewed with a vertical line screen behind it.

My invention has for its object to provide an apparatus which will produce a relief or stereoscopic picture by the use of a multiplicity of lenses, arranged in the arc of a circle, which are combined with a corresponding number of prisms designed to superimpose the image from each lens upon a sensitized plate, through a line screen spaced from said plate. The result will be that a positive produced from this negative will, if viewed with the line screen, interposed between the light source and the plate with the emulsion side of the plate towards the screen produce a stereoscopic picture.

I have found that it is absolutely essential in order to attain satisfactory results to have the viewing screen slightly coarser in spacing than the taking screen, so that the transparent strips will exactly match the panel strips of the image which necessarily are coarser than the line of the taking screen.

In the accompanying drawing, which is hereunto annexed and a part of this specification, I have diagrammatically illustrated apparatus for taking and viewing pictures in this manner.

Fig. 1 shows a method of making stereoscopic negatives by exposing a sensitized plate behind a screen consisting of alternate, opaque and transparent vertical lines, the screen being slightly spaced from the plate, the exposure being made through a multiplicity of lenses and prisms, and Fig. 2 shows in diagrammatic form the method of viewing a positive made from a negative formed in this manner.

Similar reference numerals refer to similar parts throughout the entire description.

As shown in Fig. 1, I locate a multiplicity of lenses 1, all of the same focal length, in the arc of a circle, each of the lenses being so directed that it will receive rays from the same area and objects in the same, except as it varies to the different angles of view. Intermediate the lenses 1 and a sensitized plate 2, I interpose a plurality of prisms 3 arranged so that the light from each lens will go through the prisms. The prisms 3 are so placed that the image thrown upon the sensitized plate 2 is superimposed exactly upon all of the images from the other lenses except where they differ on account of the different angles of view.

In front of the plate 2 and spaced therefrom, I mount a line screen 4 which consists of a plurality of alternate, opaque and transparent vertical lines so that the negative will consist of a multiplicity of paneled or strip images. The lenses are all toed in, for it will be apparent to persons skilled in the art that, if they were fronted straight ahead, each lens would have a different view but by combining the lenses 1 and the prisms 3 I obtain an identical image except for the different viewing angle.

These prisms 3 are used, not for the purpose of reversing an image but to insure the overlaps of the image from the light reflected from the object being photographed. Suitable diaphragms 5 are provided for the lenses 1 for making a simultaneous exposure.

If the negative thus produced is used to form a positive on to a photographic emulsion to form a positive, the resultant positive will be pseudoscopic when viewed through a line screen. It therefore becomes necessary to provide some means to produce a stereoscopic picture. I accomplish this by the manner shown in Fig. 2 in which the positive plate 6 which has been made from the negative 2 is placed with the emulsion side towards the light source 7 which is preferably mounted in front of a reflector 8, the curvature of which is designed to reflect the light rays so as to obtain uniform distribution thereof on to a diffusion screen 9 preferably formed of ground glass, or some similar manner of producing translucent diffusing glass. Between the diffusing screen 9 and the positive 6, I interpose a screen 10 which is formed of alternate opaque and transparent lines. The eyes of the observer are indicated by numeral 11. When viewed in this manner the positive 6 will be truly stereoscopic and will present a third dimension picture which is highly satisfactory.

However, if the viewing screen 10 is identical with the taking screen 4, a picture will be distorted and may present a moiré pattern. This is due to the fact that owing to the spacing of the line screen 4 from the plate 2, the panel images are each wider than the transparent lines of the screen 4, for this spacing of the screen 4 from the plate 2 produces fewer strip images on each plate than the number of lines in the screen. For this reason the viewing screen 10 must be made so that its transparent spaces are sufficiently close together so that the result will be stereoscopic and all moiré patterning will be avoided.

From the foregoing it will be obvious that in this manner I produce a stereoscopic picture without the necessity of employing a moving camera or apparatus and also without the tremendous expense involved in the use of a large lens.

Having described my invention what I regard as new and desire to secure by Letters Patent, is:

1. The combination, with a light source, of a stereoscopic picture, comprising a positive made from a negative consisting of a multiplicity of panel images made by a single exposure on a stationary sensitized plate, through a multiplicity of lenses mounted in an arc, each having a prism adjacent, said exposure being made through a screen of alternate opaque and transparent vertical lines, and a viewing screen, also consisting of alternate opaque and transparent vertical lines, mounted intermediate said picture and said light source, the spacing between the lines in the viewing screen being wider than in the taking screen.

2. The combination, with a light source, of a stereoscopic picture, comprising a positive made from a negative consisting of a multiplicity of panel images made by a single exposure on a stationary sensitized plate through a multiplicity of lenses mounted in an arc, said lenses being toed in so they all point to a common point, each lens having a prism adjacent, said exposure being made through a screen of alternate opaque and transparent vertical lines, and a viewing screen, also consisting of alternate opaque and transparent vertical lines, mounted intermediate said picture and said light source, the spacing between the lines in the viewing screen being wider than in the taking screen.

3. The combination with a light source, of a reflector, a diffusing screen, a stereoscopic picture comprising a positive made from a negative consisting of a multiplicity of strip images formed by making a single exposure on a stationary sensitized plate through a multiplicity of lenses mounted in an arc, each having a prism intermediate the lens and the plate, said exposure being made through a screen of alternate, opaque and transparent vertical lines and a viewing screen also consisting of alternate, opaque and transparent vertical lines mounted intermediate said picture and said diffusing screen, the spacing between the opaque lines in the viewing screen being wider than in the taking screen.

4. The combination, with a light source, of a stereoscopic picture, comprising a positive made from a negative consisting of a multiplicity of panel images made by a single exposure on a stationary sensitized plate, through a multiplicity of lenses of the same focal length, mounted in an arc, each having a prism adjacent, said exposure being made through a screen of alternate opaque and transparent vertical lines, and a viewing screen, also consisting of alternate opaque and transparent vertical lines, mounted intermediate said picture and said light source, the spacing between the lines in the viewing screen being wider than in the taking screen.

5. The combination, with a light source, of a stereoscopic picture, comprising a positive made from a negative consisting of a multiplicity of panel images made by a single exposure on a stationary photographic emulsion through a multiplicity of lenses mounted in an arc, said lenses being toed in so they all point to a common point, each lens having a prism adjacent, said exposure being made through a screen of alternate opaque and transparent vertical lines, and a viewing screen, also consisting of alternate opaque and transparent vertical lines, mounted intermediate said picture and said light source, the spacing between the lines in the viewing screen being wider than in the taking screen.

ERNEST E. DRAPER.